Jan. 22, 1929.  1,700,068
H. MEURIN
SIGNALING DEVICE FOR MACHINES
Filed April 3, 1928  2 Sheets-Sheet 1

INVENTOR
Henri Meurin
BY
ATTORNEY

Jan. 22, 1929.                                           1,700,068
                      H. MEURIN
              SIGNALING DEVICE FOR MACHINES
              Filed April 3, 1928        2 Sheets-Sheet 2

INVENTOR
Henri Meurin
BY
ATTORNEY

Patented Jan. 22, 1929.

1,700,068

UNITED STATES PATENT OFFICE.

HENRI MEURIN, OF LEVALLOIS-PERRET, FRANCE, ASSIGNOR TO SOCIETE H. TRENTE-LIVRES & CO., OF LEVALLOIS-PERRET, FRANCE.

SIGNALING DEVICE FOR MACHINES.

Application filed April 3, 1928, Serial No. 267,123, and in France March 2, 1928.

The present invention relates to an apparatus adapted to warn the operator of a machine each time one of the parts attains the limit of functioning for which it will be necessary to carry out an inspection, lubrication, filling, or any suitable upkeep operation which may be required, which limit of duration may be determined in advance by the constructor and may be different for the several elements.

The said invention is applicable to all machines in which the duration of the operating period of the elements requiring upkeep has a certain relation to a linear or circumferential displacement of one or more of the other elements of the machine, this displacement being registered by the present apparatus. The said invention will be further described by way of example as applied to motor vehicles.

Herein the actuating part may consist of the power transmission shaft, the continuous driving element of the change-speed box, the wheels, or the like, and the motion is transmitted proportionally to the displacements of the various parts requiring upkeep, in such manner that the device will show the operator the given operation to be performed and the exact time at which it is to be executed.

The internal mechanism of the apparatus consists of spur or worm gearing, racks, or like devices. The indication preferably remains visible until external means are employed to effect the disappearance of the corresponding visual indicator, for instance a controlling button is pushed by the finger.

In some cases in which it is necessary to observe the matter of the upkeep, a retaining device is employed to hold the signal members in the visible position, so that they may only be returned to the disappearing position by a special key.

The power transmission between the element in motion and the apparatus may be assured by a metallic cable provided with a sheath, by rigid rods, or the like. For this transmission I may employ electric, magnetic or hydraulic means, compressed air, vacuum or the like.

Luminous signals may be provided for night use.

I may employ any of the known speed indicators or counters or revolutions, by modifying them in order to provide the necessary indications.

The appended drawings show by way of example an embodiment of the invention.

Figure 1:
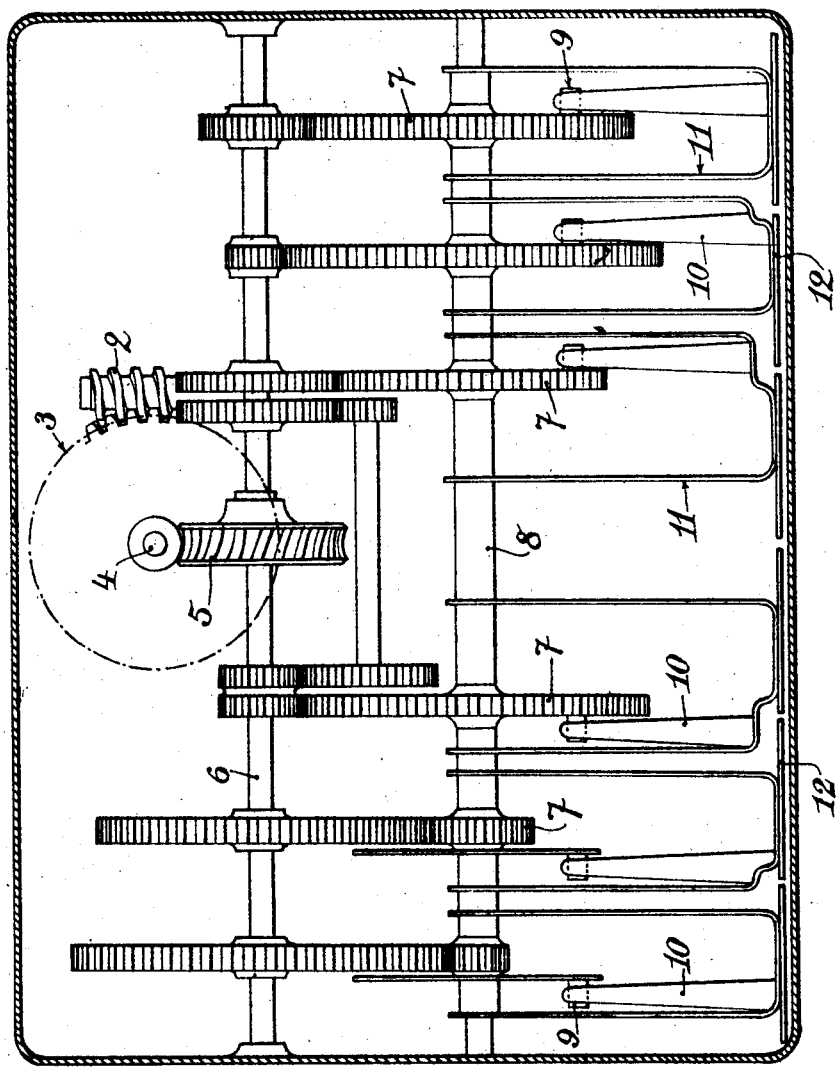
Fig. 1 is a front elevational view of the mechanism of the apparatus.
Figures 2, 3:
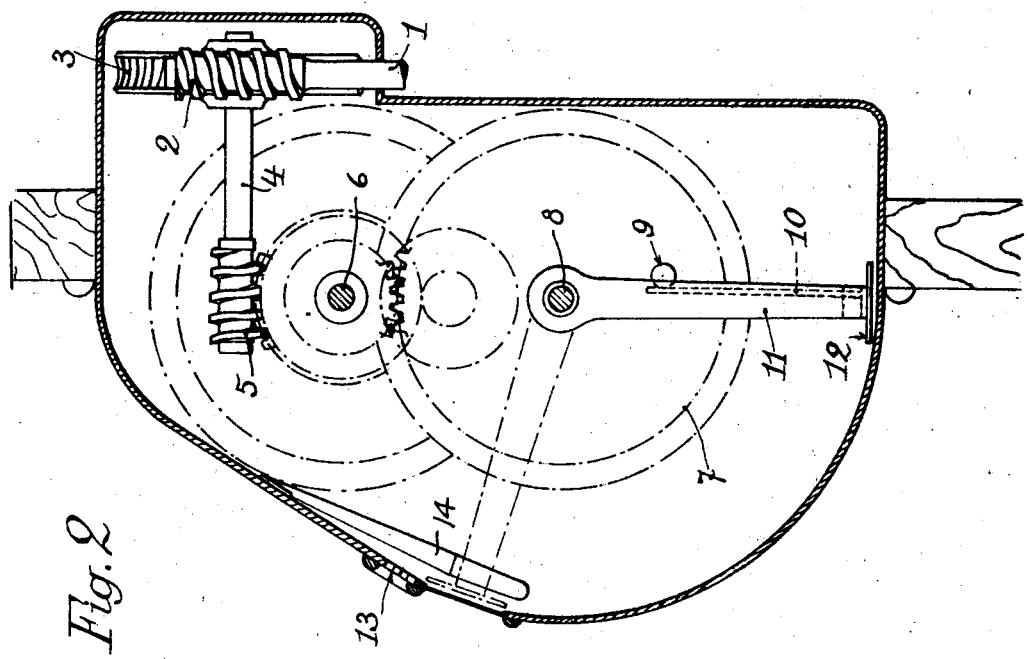
Fig. 2 is a sectional view.
Fig. 3 shows a device for holding the parts.

1 is the sheath of the cable actuating the apparatus, and 2 the endless screw secured to said cable and coacting with the worm wheel 3.

The shaft of the said wheel actuates by worm gearing 5 a main shaft 6 which drives by a set of gears of suitable ratio a set of pinions 7 rotatable on an axle 8.

Each of the said pinions carries a finger 9 which coacts with a flexible strip 10 mounted upon an arm 11 carrying an indicating member 12.

It will be observed that for each revolution of one of the pinions 7, the corresponding indicating disk or like member is made to coincide with a window 13 of the casing of the apparatus. The necessary work is then performed, and the indicating member is brought into the original position. This movement can be performed by reason of the elasticity of the strip 10, and this elasticity also permits the pinion to continue its revolution without difficulty as long as the machine is not stopped.

The arm 11, when the indicating member coincides with the window, will be engaged in a clamping device 14 which serves to hold it. To cause the indicating device to disappear, it is necessary to employ a special key 15 which spreads apart the branches of the said clamp.

The motion of the indicating members is very slow, so that a disc carrying red indications, and turning at a speed much greater than the driving shaft, will bring these red indications into coincidence with the sighting plate at relatively short intervals of time, whereby the proper operation of the apparatus will be assured at all times, after the manner of an electric meter.

Having thus described my apparatus, what I claim as new therein, and my own invention, is:—

1. In a signaling apparatus relating to the upkeep of machines, the combination of a plurality of movable indicating discs, carrying indications concerning the operations to be performed, controlling means to bring each of said discs into display position respectively at the end of a predetermined period of operation of the machine, means to hold said discs in said position, means to release them at will and means for preventing said controlling means from actuating said discs in said position.

2. In a signaling apparatus relating to the upkeep of machines, the combination of a plurality of movable indicating discs, carrying indications concerning the operations to be performed, a common shaft on which all discs are made to swing, a shaft actuated by the movement of a member of the machine, variously sized pinions keyed on said shaft, loosely mounted pinions on the disc shaft meshing with said pinions, a crank pin on each loose pinion adapted to actuate the respective indicating disc, means for maintaining said discs in the positions into which they have been brought, means for releasing them at will and means for preventing said controlling means from actuating said discs in said position.

3. In a signaling apparatus relating to the upkeep of machines, the combination of a plurality of movable indicating disks carrying indications concerning the operations to be performed, controlling means to bring each of said discs into display position respectively at the end of a predetermined period of operation of the machine, claws between the prongs of which the indicating discs are adapted to be engaged and frictionally held in such position, means for releasing the latter at will and means for preventing said controlling means from actuating said discs in said position.

4. In a signaling apparatus relating to the upkeep of machines, the combination of a plurality of movable indicating discs carrying indications concerning the operations to be performed, controlling means to bring each of said discs into display position respectively at the end of a predetermined period of operation of the machine, claws between the prongs of which the indicating discs are adapted to be engaged and frictionally retained, said indicating discs being adapted to be released from said claws by means of a key and means for preventing the controlling means from actuating the discs in said position.

5. In a signaling apparatus relating to the upkeep of machines, the combination of a plurality of movable indicating discs carrying indications concerning the operation to be performed, a common shaft on which all discs are adapted to oscillate, a shaft actuated by the movement of a member of the machine, variously sized pinions keyed on said shaft, loose pinions mounted on the disc shaft, meshing with said pinions, a crank pin on each loose pinion to bring the respective indicating disc into the position of display, a spring strip on each indicating disc bearing with the free end thereof on said crank pin, means for holding said indicating discs in said position, means for releasing them at will.

In testimony whereof I have hereunto affixed my signature.

HENRI MEURIN.